Patented June 12, 1945

2,378,048

UNITED STATES PATENT OFFICE 2,378,048

METHOD OF MAKING HALOACETYL HALIDES

Clement W. Theobald, Christiana Hundred, Del., assignor to E. I. du Pont de Nemours & Company, Wilmington, Del., a corporation of Delaware No Drawing. Application April 7, 1944, Serial No. 530,069

7 Claims. (Cl. 260—544)

This invention relates to the preparation of haloacetyl halides, and more particularly to the preparation of chloroacetyl chlorides.

While there has long been a need for a practicable method for producing haloacetyl halides, and particularly chloroacetyl chlorides, from low-cost materials, no such process has hitherto been known.

Accordingly, this invention has as an object the provision of a practicable process for the production of haloacetyl halides. A further object is the practicable production of said halides from low-cost materials. A still further object is the practicable production of chloroacetyl chlorides from low-cost materials. Still further objects are the economical and practicable preparation of trichloroacetyl chloride, dichloroacetyl chloride and chloroacetyl chloride. Additional objects will become apparent from an examination of the following description and claims.

These and other objects and advantages are accomplished by the herein described invention which broadly comprises heating a substantially anhydrous mixture of carbon monoxide and a polyhalomethane in the presence of a substantially anhydrous Friedel-Crafts type catalyst at a temperature within the range of from about 70° C. to about 400° C. and under superatmospheric pressure.

In a more restricted sense this invention comprises heating, under a pressure within the range of from about 50 atmospheres to about 1000 atmospheres and at a temperature within the range of from 100° C. to 250° C., a substantially anhydrous mixture of carbon monoxide and a polychloromethane in the presence of a substantially anhydrous chloride, said chloride being a Friedel-Crafts type catalyst.

A preferred embodiment of this invention comprises heating a substantially anhydrous mixture of carbon monoxide and carbon tetrachloride in the presence of substantially anhydrous aluminum chloride at a temperature within the range of from 100° C. to 250° C. and under a pressure within the range of from about 50 atmospheres to about 1000 atmospheres.

In accordance with one preferred embodiment of this invention, a polyhalomethane is placed in a pressure vessel along with a catalyst of the type employed in Friedel-Crafts condensations. Carbon monoxide gas is then added under pressure and the tube is sealed and heated with agitation. As the carbon monoxide is absorbed by the reaction, additional quantities are added to maintain the pressure at the desired level. Upon completion of the reaction, usually 1 to 8 hours, the tube is cooled to room temperature or below and the pressured carbon monoxide released. The product is then separated from the catalyst and unreacted material by distillation, extraction, or other suitable means.

The following examples, in which proportions are given in parts by weight unless otherwise specified, are given for illustrative purposes and are not intended to place any restrictions or limitations on the herein described invention.

Example I

Carbon tetrachloride (200 parts) and 20 parts of anhydrous aluminum chloride are placed in a silver-lined pressure vessel; carbon monoxide is added to a pressure of 250 atm. The vessel is then heated to 200° C. and additional carbon monoxide is added to bring the pressure up to 95 atm. Under these conditions the tube is heated and agitated for 6 hours. During this time, additional carbon monoxide is added as necessary to maintain the pressure. The reactor is then cooled to room temperature and the pressure released slowly. The volatile materials are removed from the catalyst under reduced pressure at room temperature. Fractionation of the products yields 87 parts of trichloroacetyl chloride (37% conversion), 75 parts of unreacted carbon tetrachloride, and small amounts of phosgene and perchloroethylene. The trichloroacetyl chloride is identified by its boiling point (118° C.), its analysis (77.8% Cl, theory= 77.9%), and by the preparation of its amide (M. P.=139–141° C., %N=8.51; reported M. P.= 141° C., theoretical %N=8.62). A small percentage of hexachloroethane may also be recovered by extraction of the catalyst. Very little tar formation occurs.

Example II

As in Example I, 200 parts of carbon tetrachloride and 25 parts of aluminum chloride are reacted with carbon monoxide under 50 atm. pressure at 150° C. for 8 hours. Trichloroacetyl chloride (17 parts) is obtained along with small amounts of phosgene. Most of the unreacted carbon tetrachloride is recovered.

Example III

As in Example I, 200 parts of carbon tetrachloride and 25 parts of anhydrous ferric chloride are reacted with carbon monoxide under 900 atm. pressure at 200° C. for 8 hours. Trichloroacetyl chloride (16 parts, 7% conversion) is obtained along with small amounts of phosgene. Most of the unreacted carbon tetrachloride is recovered.

*Example IV*

As in Example I, 200 parts of chloroform and 20 parts of anhydrous aluminum chloride are reacted with carbon monoxide under 900 atm. pressure at 150° C. for 6 hours. Dichloroacetyl chloride (53 parts, 21% conversion) is obtained along with unreacted chloroform and small amounts of phosgene. The dichloroacetyl chloride is identified by its boiling point (108° C.) and the preparation of its anilide (M. P. 117–119° C., %N=6.74; reported M. P.=119° C., theoretical N=6.9%). As with carbon tetrachloride, very little tar is formed.

*Example V*

As in Example I, 200 parts of methylene chloride, 25 parts of aluminum chloride, and 1 part hydrogen chloride are reacted with carbon monoxide at 200° C. and 900 atm. for 8 hours. Monochloroacetyl chloride (5 parts) is obtained, and substantially all the remaining methylene chloride is recovered. The chloroacetyl chloride is identified by its boiling point (105° C.) and the preparation of its anilide, M. P. 133–134° C. (reported M. P. =134° C.)

It is to be understood that the hereinbefore disclosed specific embodiments of this invention may be subject to variation and modification without departing from the scope thereof. For instance, while this invention has been described with particular reference to the reaction of carbon monoxide with polychloromethanes, it is not limited thereto. Carbon monoxide may be reacted in accordance with this invention with any polyhalomethane, i. e., with any compound having the general formula

wherein the X substituents are selected from the group consisting of hydrogen and halogen atoms, at least two of the X substituents being halogen atoms. By halogen atoms are meant, of course, atoms selected from the group consisting of fluorine, chlorine, bromine and iodine atoms. Included among examples of said polyhalomethanes are: carbon tetrachloride, chloroform, methylene chloride, bromoform, carbon tetrabromide, methylene bromide, iodoform, methylene iodide, carbon tetrafluoride, fluoroform, methylene fluoride, trichlorofluoromethane, chlorotrifluoromethane and the like. While this invention is operable generally with any polyhalomethane, the choloroacetyl chlorides, namely, trichloroacetyl chloride, dichloroacetyl chloride and chloroacetyl chloride, had by reacting carbon monoxide in accordance with this invention with carbon tetrachloride, chloroform and methylene chloride, respectively, have greatest commercial utility. The reaction with halogenated methanes containing at least three halogen atoms, e. g., carbon tetrachloride and chloroform, is preferred because higher yields are obtained therefrom as indicated in the examples.

The reaction of polyhalomethanes with carbon monoxide in accordance with this invention may be illustrated by the following equations:

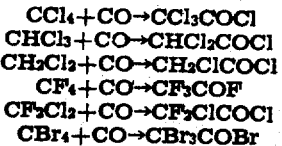

Catalysts which are useful in the reaction between carbon monoxide and polyhalomethanes comprise those which are applicable to the well-known Friedel-Crafts condensation. The best catalysts for any specific reaction will depend upon the time, temperature, and pressure of operation, and the reactivity of the halogenated compound. Anhydrous salts such as aluminum chloride, aluminum bromide, and ferric chloride are of most general utility. Zinc chloride, tin tetrachloride, titanium tetrachloride, zirconium tetrachloride and boron trifluoride are also of value. In certain instances it is preferable to modify the activity of these catalysts by the use of complex salts, for example, $Al_2Cl_6.2NaCl$, $Al_2Cl_6.1.5ZnCl_2$ and $Al_2Cl_6.2CuCl$. Similarly, complexes with organic compounds may be employed; for example $C_6H_5AlCl_2$, $AlCl_3RCOCl$, and $AlCl_3CHCl_3$. Additional modification of the catalyst's activity may be effected also by an added acid, for example, the combination of aluminum chloride and hydrogen chloride. Finally, it may be desirable to support the catalyst upon materials such as carbon, barium sulfate, kieselguhr, and the like. The use of a catalyst support is particularly desirable when the reaction is carried out as a continuous vapor phase process.

This invention is operable under any pressure greater than atmospheric pressure. However, pressures of less than about 50 atmospheres are not ordinarily recommended on account of the lower yields usually obtained therewith. Pressures in excess of 1000 atmospheres may be employed but are ordinarily not used since they do not result in substantially increased yields and do increase the cost of the reaction materially.

It is essential that the reaction of this invention should be effected at a temperature within the range of from about 70° C. to about 400° C. While appreciable effects are had at temperatures as low as about 70° C. and as high as about 400° C., optimum yields are obtained when the reaction is conducted at a temperature within the range of from 100° C. to 250° C.

The reaction of the instant invention may be effected as a batch liquid phase operation, or as a continuous vapor phase operation. Where the reaction is carried out as a continuous process, it is in general, preferable to operate at the higher temperatures and lower pressures with an appropriate contact time usually only a few minutes. For example, a mixture of carbon tetrachloride and carbon monoxide can be passed over the aluminum chloride catalyst deposited on carbon at a temperature of 300° C. When a batch process is operated, higher pressures are generally used with somewhat lower temperatures and correspondingly increased times of reaction.

The haloacetyl halides obtainable by this invention are readily convertible to the corresponding acids and other simple derivatives by reactions well known to the art. In the form of these derivatives, the products of this invention are exceedingly useful as pesticides, rubber chemicals, dyes, medicinals, solvents, and as specialty acids in the leather, metal, and electroplating industries.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. The process for obtaining a haloacetyl halide, which comprises heating, under superatmospheric pressure and at a temperature within the range of from 70° C. to about 400° C., a substantially anhydrous mixture of carbon monoxide and a polyhalogenated methane in the presence of a substantially anhydrous Friedel-Crafts type catalyst.

2. The process according to claim 1 wherein the reaction is effected as a batch liquid phase operation.

3. The process according to claim 1 wherein the reaction is effected as a continuous vapor phase operation.

4. The process for obtaining a chloroacetyl chloride, which comprises heating, under a pressure within the range of from about 50 atmospheres to about 1000 atmospheres and at a temperature within the range of from 100° C. to 250° C., a substantially anhydrous mixture of carbon monoxide and a polychloromethane in the presence of a substantially anhydrous chloride, said chloride being a Friedel-Crafts type catalyst.

5. The process for obtaining trichloroacetyl chloride, which comprises heating, under a pressure within the range of from about 50 atmospheres to about 1000 atmospheres and at a temperature within the range of from 100° C. to 250° C., a substantially anhydrous mixture of carbon monoxide and carbon tetrachloride in the presence of a substantially anhydrous chloride, said chloride being a Friedel-Crafts type catalyst.

6. The process according to claim 5 wherein the chloride catalyst is aluminum chloride.

7. The process for obtaining dichloroacetyl chloride, which comprises heating, under a pressure within the range of from about 50 atmospheres to about 1000 atmospheres and at a temperature within the range of from 100° C. to 250° C., a substantially anhydrous mixture of carbon monoxide and chloroform in the presence of a substantially anhydrous chloride, said chloride being a Friedel-Crafts type catalyst.

CLEMENT W. THEOBALD.

CERTIFICATE OF CORRECTION.

Patent No. 2,378,048. June 12, 1945.

CLEMENT W. THEOBALD.

It is hereby certified that error appears in the printed specification of the above numbered patent requiring correction as follows: Page 1, second column, line 23, for "95" read --950--; page 3, first column, line 14, claim 1, before "70° C." insert the word --about--; and that the said Letters Patent should be read with this correction therein that the same may conform to the record of the case in the Patent Office.

Signed and sealed this 25th day of September, A. D. 1945.

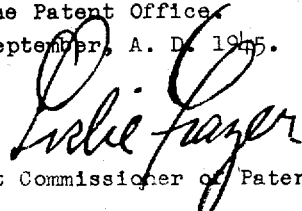

(Seal)    First Assistant Commissioner of Patents.

in the leather, metal, and electroplating industries.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. The process for obtaining a haloacetyl halide, which comprises heating, under superatmospheric pressure and at a temperature within the range of from 70° C. to about 400° C., a substantially anhydrous mixture of carbon monoxide and a polyhalogenated methane in the presence of a substantially anhydrous Friedel-Crafts type catalyst.

2. The process according to claim 1 wherein the reaction is effected as a batch liquid phase operation.

3. The process according to claim 1 wherein the reaction is effected as a continuous vapor phase operation.

4. The process for obtaining a chloroacetyl chloride, which comprises heating, under a pressure within the range of from about 50 atmospheres to about 1000 atmospheres and at a temperature within the range of from 100° C. to 250° C., a substantially anhydrous mixture of carbon monoxide and a polychloromethane in the presence of a substantially anhydrous chloride, said chloride being a Friedel-Crafts type catalyst.

5. The process for obtaining trichloroacetyl chloride, which comprises heating, under a pressure within the range of from about 50 atmospheres to about 1000 atmospheres and at a temperature within the range of from 100° C. to 250° C., a substantially anhydrous mixture of carbon monoxide and carbon tetrachloride in the presence of a substantially anhydrous chloride, said chloride being a Friedel-Crafts type catalyst.

6. The process according to claim 5 wherein the chloride catalyst is aluminum chloride.

7. The process for obtaining dichloroacetyl chloride, which comprises heating, under a pressure within the range of from about 50 atmospheres to about 1000 atmospheres and at a temperature within the range of from 100° C. to 250° C., a substantially anhydrous mixture of carbon monoxide and chloroform in the presence of a substantially anhydrous chloride, said chloride being a Friedel-Crafts type catalyst.

CLEMENT W. THEOBALD.

CERTIFICATE OF CORRECTION.

Patent No. 2,378,048.　　　　　　　　　　　　　　June 12, 1945.

CLEMENT W. THEOBALD.

It is hereby certified that error appears in the printed specification of the above numbered patent requiring correction as follows: Page 1, second column, line 23, for "95" read --950--; page 3, first column, line 14, claim 1, before "70° C." insert the word --about--; and that the said Letters Patent should be read with this correction therein that the same may conform to the record of the case in the Patent Office.

Signed and sealed this 25th day of September, A. D. 1945.

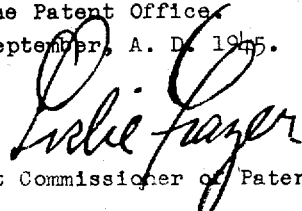

(Seal)　　　　　　　First Assistant Commissioner of Patents.